No. 750,810. PATENTED FEB. 2, 1904.
V. CHARTENER.
SECURING MEANS FOR REMOVABLE JOURNAL BOXES.
APPLICATION FILED JULY 6, 1903.
NO MODEL. 2 SHEETS—SHEET 1.
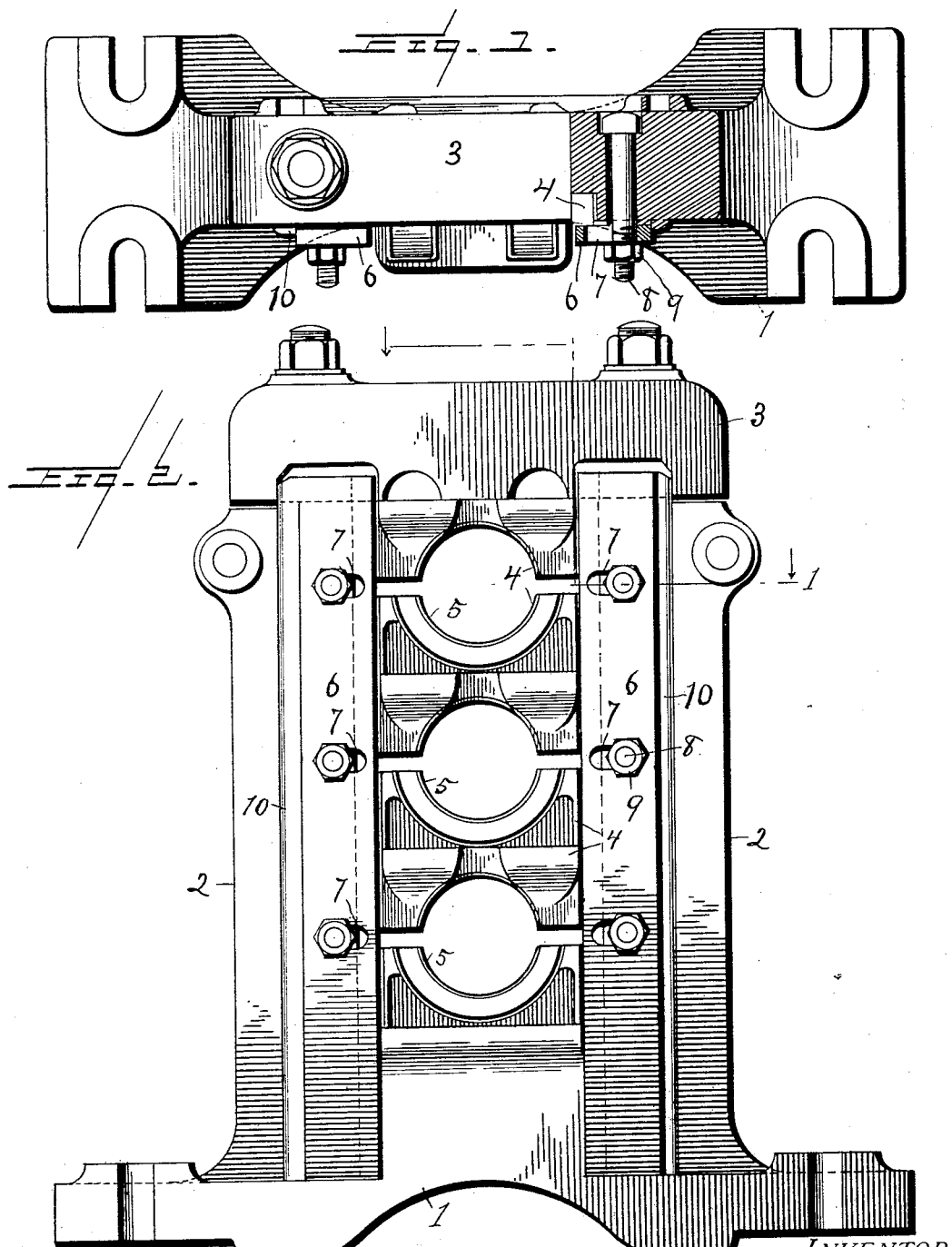

No. 750,810. PATENTED FEB. 2, 1904.
V. CHARTENER.
SECURING MEANS FOR REMOVABLE JOURNAL BOXES.
APPLICATION FILED JULY 6, 1903.
NO MODEL. 2 SHEETS—SHEET 2.
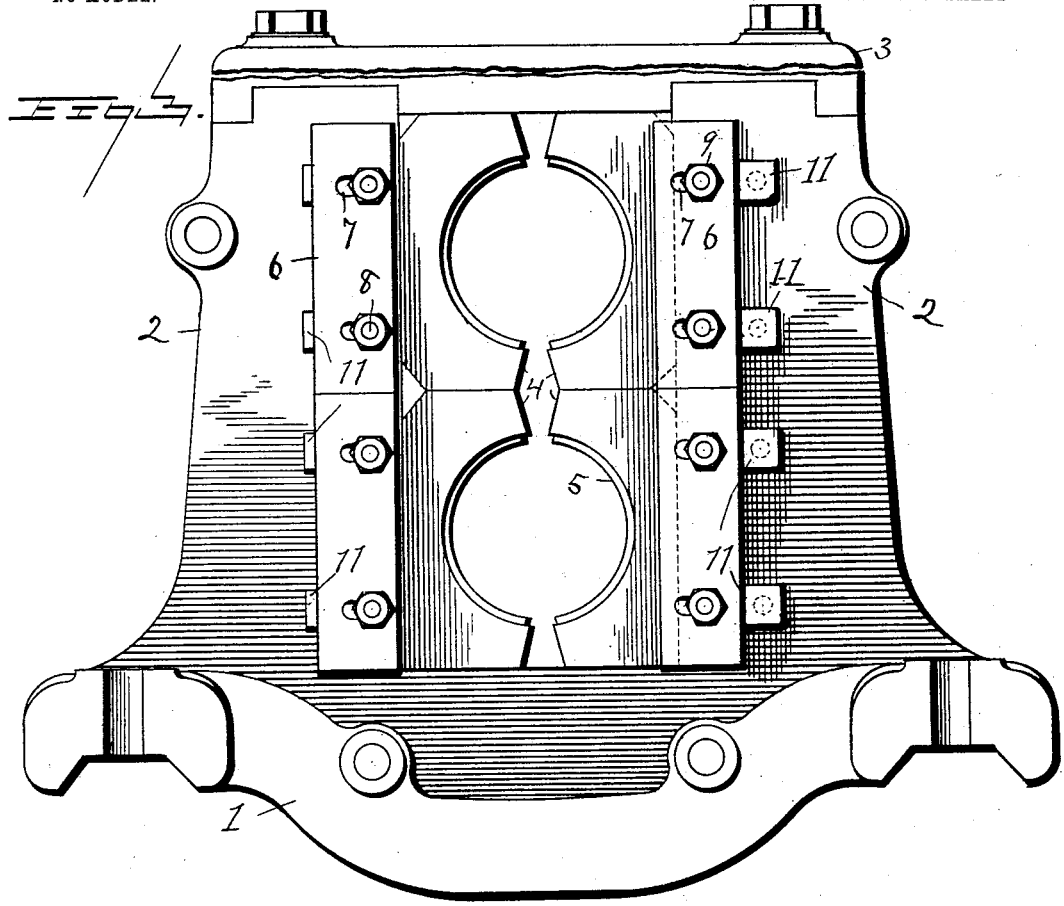
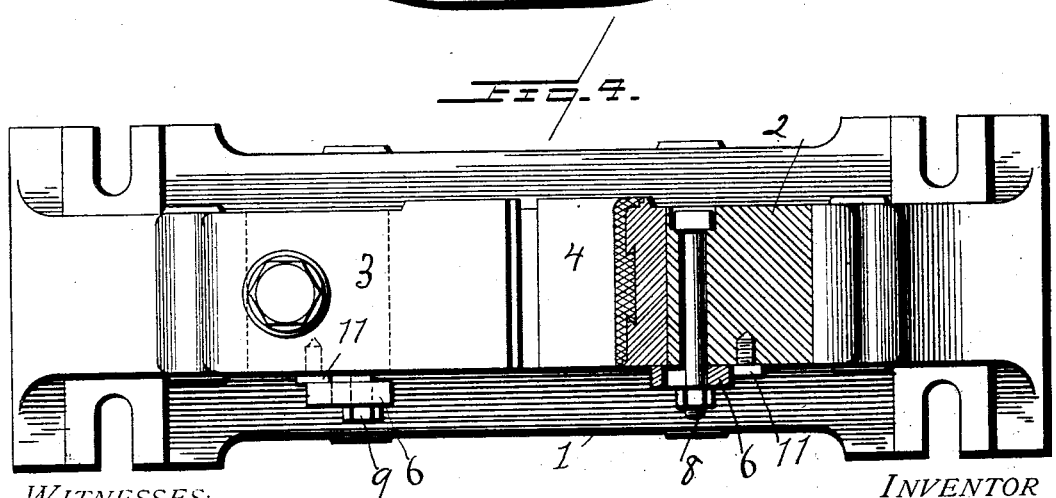
WITNESSES
W. F. Doyle.
F. N. Barber.
INVENTOR
Victor Chartener
BY Wm L. Pierce
Attorney.

No. 750,810. Patented February 2, 1904.

UNITED STATES PATENT OFFICE.

VICTOR CHARTENER, OF PITTSBURG, PENNSYLVANIA, ASSIGNOR TO A. GARRISON FOUNDRY COMPANY, A CORPORATION OF PENNSYLVANIA.

SECURING MEANS FOR REMOVABLE JOURNAL-BOXES.

SPECIFICATION forming part of Letters Patent No. 750,810, dated February 2, 1904.

Application filed July 6, 1903. Serial No. 164,333. (No model.)

*To all whom it may concern:*

Be it known that I, VICTOR CHARTENER, a citizen of the United States, residing at the city of Pittsburg, in the county of Allegheny and State of Pennsylvania, have invented or discovered new and useful Improvements in Securing Means for Removable Journal-Boxes, of which the following is a specification.

In the accompanying drawings, which make part of this specification, Figure 1 is a view, partly in plan and partly in horizontal section, as indicated by the line 1 1 of Fig. 2. Fig. 2 is an end elevation. Fig. 3 is an end elevation showing a second form which my invention may take. Fig. 4 is a view showing the left half of Fig. 3 in plan and the right half in horizontal section.

My invention relates to housings and boxes for rolls, shafts, and the like; and the object thereof is to provide a housing from which the journal-blocks may be easily and quickly taken out and inserted without removing any of the parts of the housing.

Referring to Figs. 1 and 2 of the drawings, 1 represents the base of a housing, 2 the vertical spaced sides thereof, preferably integral with the base, and 3 the cap of the housing, bolted to the top of and spanning the space between the sides 2. Between the sides 2 are superposed a set of six journal blocks or boxes 4, arranged in pairs, so as to form bearings 5 for three rolls.

The journal-boxes are held in place by the vertical plates 6, which are bolted to the sides 2 and overlap the sides and the ends of the boxes. The plates 6 are provided with short horizontal slots 7, whose length is as great as the distance the plates overlap the boxes. Bolts 8, seated in the housing, project out through the slots 7 and have nuts 9, which secure the plates against the sides of the housing and the ends of the journal-boxes. Vertical ribs 10, formed integrally or otherwise on the ends of the housing, are provided to prevent the plates 6 from moving in a direction away from the center of the boxes. The bolts are normally at the outer ends of the slots 7, and so prevent the plates from moving toward each other.

When it is desired to withdraw the boxes 4, the nuts 9 are loosened, so that the plates 6 may be pulled toward the inner ends of the slots and slid over the ribs 10 till the bolts lie in the opposite ends of the slots 7 in which they previously lay. The plates then lie wholly on the sides 2 of the housing, permitting the boxes to be withdrawn. When it is desired to insert the boxes, the plates and nuts are already on the bolts, and no time is lost looking for lost nuts or plates. Where the nuts need to be entirely removed, they are frequently dropped or mislaid. By my invention the parts are always assembled and need only to be adjusted to their normal positions.

Figs. 3 and 4 are like Figs. 1 and 2, except the ribs 10 of the latter are not used. I tap a number of holes into the housings and screw into them lag-bolts 11, whose heads lie against the outer sides of the plates 6 and perform the same function as the said ribs. In Figs. 3 and 4 the left-hand plate is shown slid to the left past the ends of the journal-boxes. In these figures the pairs of boxes are divided on a vertical line instead of on horizontal lines, as in Figs. 1 and 2.

I do not restrict myself to the precise details shown—as, for example, different devices than nuts may hold the plates in place, and other means than slots may be used to hold the plates attached to the housings without departing from the principle of my invention.

Having described my invention, I claim—

1. A housing, a removable journal-box therein, and means secured to the exterior of the housing and overlapping the journal-box to prevent the removal of the latter, said means being mounted so as to be moved from the path of the removal of the box while still secured to the housing.

2. A housing, a removable journal-box therein, a plate secured to the housing and overlapping the journal-box to retain the latter in place; and means on the housing for releasably securing the plate to the housing, the construction being such that the plate may be removed from its overlapping position, the said securing means still remaining connected to the housing.

3. A housing, a removable journal-box therein, a projection on the housing, a plate seated on the housing with an edge against the projection and another portion overlapping the journal-box, and means securing the plate to the housing and separable from the plate to permit the latter to be raised above the shoulder and slid from its position overlapping the journal-box.

Signed at Pittsburg this 2d day of July, 1903.

VICTOR CHARTENER.

Witnesses:
F. N. BARBER,
A. M. STEEN.